United States Patent

Tannenberger et al.

[15] 3,645,786
[45] Feb. 29, 1972

[54] METHOD FOR DEPOSITING ON A SUPPORT A THIN LAYER OF A SOLID CERAMIC ELECTROLYTE FOR A FUEL CELL

[72] Inventors: Helmut Tannenberger, 4, Avenue Jules Crosnier; Pierre Lanaspeze, 20 rue des Caroubiers, both of Geneva, Switzerland

[22] Filed: July 18, 1968

[21] Appl. No.: 745,726

[30] Foreign Application Priority Data

July 19, 1967 Switzerland .......................... 10255/67

[52] U.S. Cl. ............................. 117/221, 117/93.3, 117/106
[51] Int. Cl. ......................................................... C23c 13/04
[58] Field of Search ........................... 117/93.3, 93, 106, 221

[56] References Cited

UNITED STATES PATENTS 3,347,701 10/1967 Yamagishi et al. .................. 117/106 R
3,453,143 7/1969 Meixner et al. ..................... 117/106 X Primary Examiner—Alfred L. Leavitt
Assistant Examiner—J. H. Newsome
Attorney—Curtis, Morris & Safford

[57] ABSTRACT

A process has been provided for preparing thin solid electrolyte layer suitable for use in fuel cells. This process comprises the following steps: making electrically conductive at least one substance intended to form the electrolyte layer; maintaining said substance placed on at least one conductor in an enclosure under a vacuum, said support being connected to at least one anode of at least one electron beam accelerating anode and being at the same potential thereof; bombarding said substance by at least one focused electron beam; increasing the energy of said beam to bring gradually the substance being bombarded to a temperature close to the melting point of the substance; and maintaining this temperature, for a sufficient time to obtain by progressive evaporation, a layer of electrolyte of a desired thickness deposited on a support placed within the enclosure.

15 Claims, 3 Drawing Figures

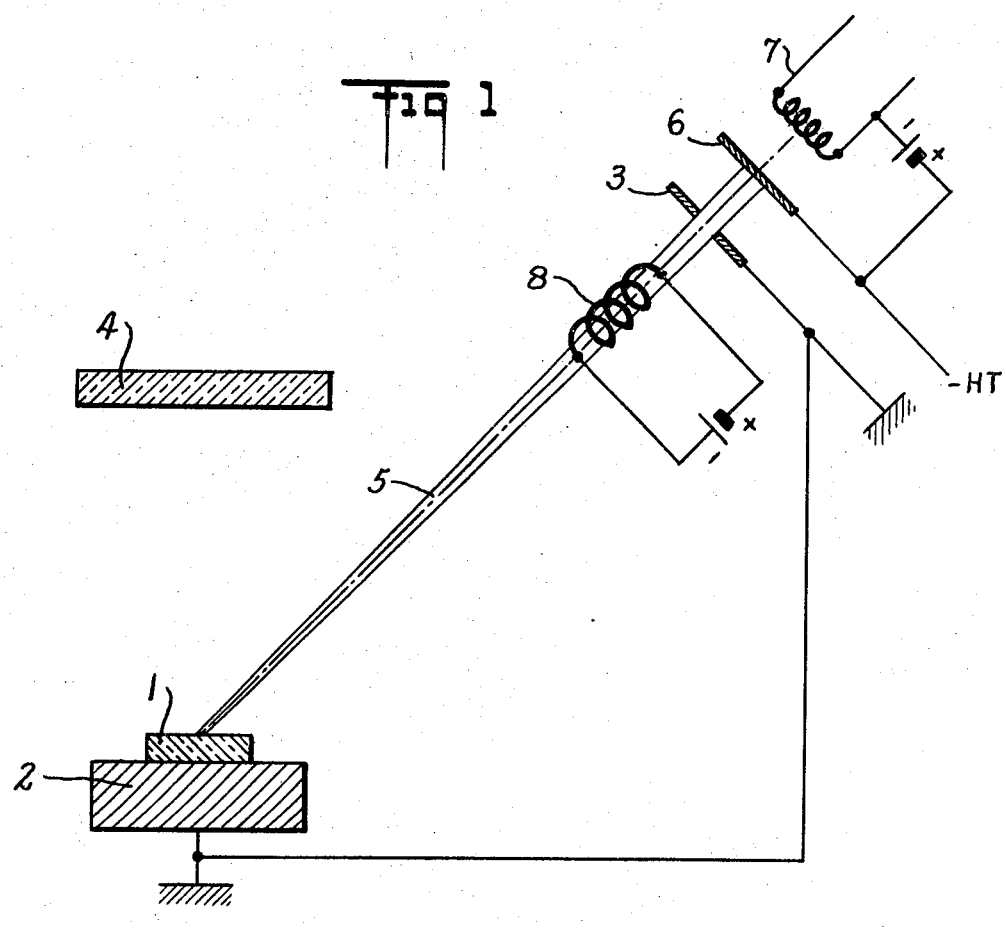
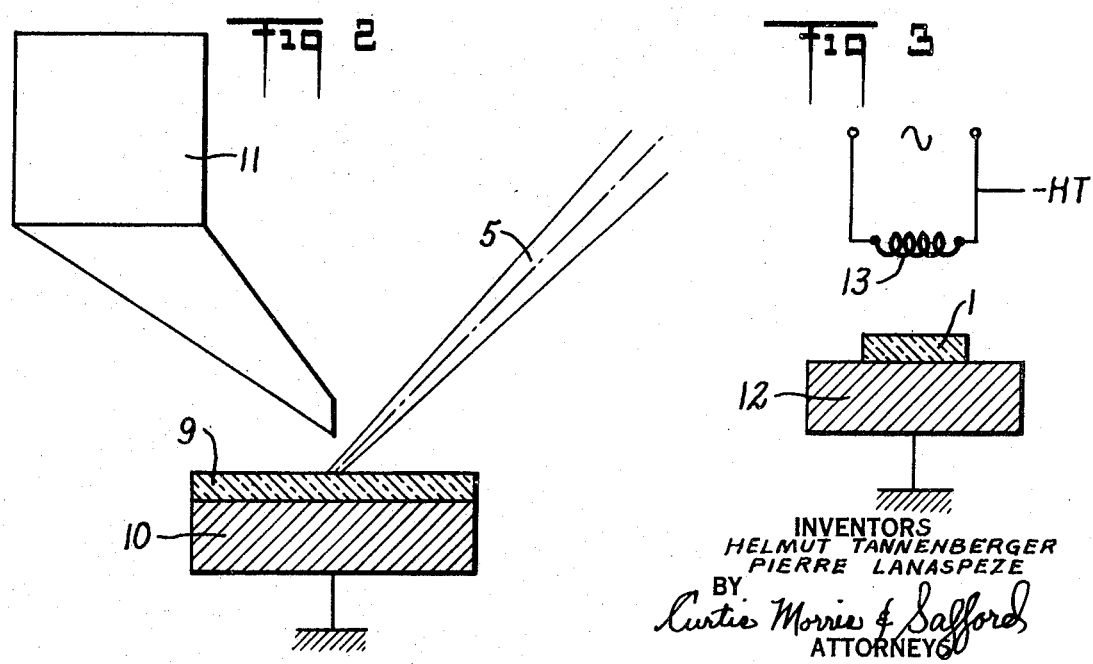

METHOD FOR DEPOSITING ON A SUPPORT A THIN LAYER OF A SOLID CERAMIC ELECTROLYTE FOR A FUEL CELL

This invention relates to fuel cells, more particularly, this invention pertains to the preparation of a thin, supported layer of a solid, ceramic electrolyte useful in a fuel cell.

As it is known, in the case of fuel cells with solid electrolyte operating at high temperature, i.e., cells in which the electrolyte is formed of a layer of ceramic material which conducts oxygen ions, it is very advantageous, if said layer is as thin as possible while being at the same time gastight.

As a matter of fact, the solid electrolytes which can be used industrially in such cells have a relatively high resistivity of the order of several dozens of ohms-centimeters for an operating temperature of the cell of about 800° C. It is, therefore, advantageous to have as thin a layer of electrolyte as possible in order to reduce the ohmic losses (resistance) in the cell to a minimum. as a matter of fact, the latter is of very great importance for the efficiency of the cell. Thus, an electrolyte having a surface of 1 cm.$^2$, a thickness of 0.1 cm. and a resistivity of 20 ohm-centimeters, and therefore a resistance of 2 ohms, causes a voltage drop of 0.2 volts when a current of 0.1 ampere is flowing. The open circuit voltage of the cell being about 1 volt, this means a loss of power of 20 percent.

Furthermore, the specific power of the cell, that is to say the energy which it can produce per unit of surface, increases in large proportions when the thickness of the electrolyte decreases. Thus, the electrolyte having the above properties makes it possible to obtain a specific power of 0.125 watts per square centimeter when the element operates under a potential difference of 0.5 volts, i.e., at half the open circuit voltage of the cell, this of course assuming that the layer of electrolyte is perfectly tight and that there is no cathode overvoltage or anode overvoltage. Under the same hypothesis, the same electrolyte, but in a thickness of 0.1 mm., makes it possible under the same operating conditions to obtain a specific power of 1.25 watts per square centimeter and one could obtain 12.5 watts per square centimeter by reducing the thickness of the electrolyte to 10 microns.

It is evident that layers of electrolytic ceramic material of a thickness as slight as those indicated above do not have sufficient mechanical strength and must be supported by a substrate which imparts the necessary strength to the cell element. Therefore, cell elements are made, particularly as described in Swiss Pat. No. 415,773, in which the electrolyte is in the form of a thin layer covering a suitable support, the essential role of which is to impart the required mechanical strength to the cell.

Two methods are known which make it possible to deposit thin layers of a ceramic material on a support.

One of these methods consists in projecting onto the support a suitable quantity of molten grains of the ceramic material to be deposited, by means of an ordinary blowtorch, and particularly an oxyacetylene blowtorch, or by means of a plasma torch. This method has the drawback that it does not make it possible to obtain tight layers of a thickness of less than 0.2 mm. Furthermore, as the support is inevitably brought to an elevated temperature, this method is not applicable with certain supports of low melting point, particularly with certain metals used as fuel cell electrode, particularly silver. Furthermore, since the substance to be deposited must be used in the form of a powder of a very precisely defined particle size—a large part of which powder is lost during the spraying—the efficiency of this process is very low and its cost is high.

The other process consists in causing at least one vapor-phase reaction which makes it possible, from suitably selected starting substances, to form directly and progressively on the surface of the substrate the layer of ceramic material of the desired composition. As such a formation takes place via seed-material of very small dimensions, it is possible, by suitably selecting the reaction conditions, to deposit thusly very thin, tight layers of a material formed of extremely small grains. This method makes it possible to obtain tight layers of a few microns thickness, but this method has certain drawbacks which interfere with its industrial use for the depositing of thin, solid electrolyte layers on a fuel cell element support.

One of these drawbacks is the extreme complexity of the carrying out of this process, particularly when it is sought in this manner to deposit a solid electrolyte which holds the greatest interest for use in fuel cells, namely, the solid electrolyte of mixed oxide having as a base zirconium oxide and at least one stabilizing oxide therefor. As a matter of fact, in this case it is necessary to effect simultaneously the reaction of several chemical substances with reaction velocities to allow the obtaining of the desired composition.

Furthermore, since the volatile compounds of zirconium and stabilizing metals, in particular rare earths, which are necessary to use, especially the halides thereof, exert a corrosive action on numerous substrates particularly metals (under the conditions necessary for vapor-phase reactions, i.e., temperatures of the order of 1,000° C.) such a process is also subject to limitations in selection of the substrates.

The method in accordance with the present invention makes it possible to obviate the said drawbacks; it is characterized by the fact that it is effected by making at least one substance intended to form the electrolyte layer electronically conductive; placing this substance in an enclosure under vacuum on at least one conductive support connected to at least one electron beam accelerating anode so that it is brought to the potential of the latter; bombarding the said substance by at least one focused beam or electrons; increasing the energy of the beam in such a manner as to bring progressively the bombarded substance to a temperature close to that of the melting point thereof; and maintaining this temperature for the period of time necessary in order to obtain, by progressive evaporation, a layer of electrolyte of desired thickness on a support placed within the enclosure.

Thus, the process in accord with the invention consists in, first of all, making the substance constituting the ceramic, solid electrolyte or the substances intended to form the electrolyte, electrically conductive, and then bombarding said substance or substances under high vacuum by a beam of electrons so as to vaporize it within an enclosure which also contains the support on which it is desired to deposit the layer of electrolyte.

The apparatus which can be used for the bombardment is, for instance, an electron gun with a focusable beam of a known type which has not undergone any particular modification for use in the carrying out of the process in accordance with the invention.

The accompanying drawing shows schematically by way of example a pair of the arrangement used for the carrying out of the process. This arrangement is known and does not constitute part of the invention; it is shown only to facilitate an understanding of the process.

FIG. 1 schematically shows the focused electron beam bombardment device in the event that the bombarded substance is in the form of a bar.

FIG. 2 is a partial view of the device of FIG. 1 in the embodiment employed in a variant of the process in which the bombarded substance is in the form of a powder.

FIG. 3 shows schematically the device used in a variant of the precess in which the substance to be bombarded is made conductive by subjecting it to the action of an unfocused beam of electrons.

As can be noted from FIG. 1, the bar 1 consisting of the substance to be bombarded, for instance, zirconium oxide stabilized by 10 mol percent of ytterbium oxide, and previously made electronically conductive in one of the manners contemplated in any of the variants of the process, is placed on a support 2 of a refractory metal, particularly tungsten or molybdenum, connected to the accelerating anode 3 of a focusable beam electron gun, only certain parts of which have been shown schematically in FIG. 1. the said support 2 being thus at the same potential, for instance, at the zero potential as the said accelerating anode 3. The assembly, as well as the support 4, is placed within an enclosure in which an exhaustive vacuum of possible $10^{-10}$ mm. Hg can be maintained.

The carrying out of the process takes place in the following manner:

After having formed a vacuum in the enclosure at a value between $10^{-4}$ and $10^{-10}$ mm. Hg, the beam of electrons 5 is produced by establishing between the cathode 6 and the accelerating anode 3 of the electron gun the accelerating potential difference -HT and establishing the heating current in the heating filament 7. The beam of electrons is focused on the target 1 by means of the focusing device 8 to a diameter of between 0.1 and 10 mm. and the energy of the beam of electrons is progressively increased by increasing the intensity of the said beam and the difference in acceleration potential -HT.

The temperature of the target, e.g., zirconium oxide, increases progressively and reaches a value just below that of its melting point for a difference in acceleration potential of the order of 2,000 to 4,000 volts. It should be noted that the zirconium then passes into the form of a paste without becoming liquid. This last value is maintained so as to prolong the evaporation of the bombarded substance for the time necessary to obtain the desired thickness of the layer.

The supports on which an electrolyte is deposited may be of any number and shape. In particular these may consist of plates or tubes. If one does not desire to exceed a thickness of the order of one micron on the part of the electrolyte layer, it is not necessary to provide any particular device either to heat or to cool these as the deposit is achieved then in perfect form at room temperature. However, if one desires to obtain layers of good quality of a thickness of more than one micron, it is indispensable to heat the substrates to a temperature of between 300° and 500° C. By this precaution one can obtain adherent tight layers of a thickness which may reach 10 to 20 microns.

For these supports there are used indiscriminately metals or ceramic materials, whether porous or nonporous, in particular porous tubes of stainless steel or of mixed oxide of $ZrO_2$ and CaO. In addition to these materials, one can also use as substrate other metals such as nickel, cobalt, silver or alloys containing at least two of the following metals: iron, nickel, cobalt or else conductive mixed oxides such as nickel oxide containing an addition of lithium oxide, ceramics such as $Al_2O_3$, MgO, $ThO_2$, $ZrO_2$ stabilized by at least one alkaline earth oxide or a rare earth oxide. It should be noted that these supports should not be at a distance closer than 10 cm. from the point of impact of the electron beam on the target. As a matter of fact, if this condition is not satisfied, the layer obtained is not homogenous. It should of course be pointed out that the depositing will preferably be effected on a substrate suitable for subsequent use in a fuel cell element. For this purpose for instance "501 IMPHY" steel containing 50 percent by weight nickel and 1 percent by weight chromium, or else magnesium and aluminum spinnell may be used. In order to obtain a homogenous deposit, it is particularly advantageous to arrange the substrates tangentially to the sphere defined by Knudsen, that is to say the sphere centered on the normal to the target at the point of impact and tangent to said target.

The rate of evaporation, naturally, depends on the power of the gun and can be selected between two extreme values which differ greatly from each other. The rate of condensation in its turn is not immaterial if it is desired to obtain a homogenous layer and it depends on the size of the Knudsen sphere selected as well as the rate of evaporation. The best results are obtained with a rate of condensation of approximately one thousand times less than the rate of evaporation. When the substrates are maintained at room temperature during the condensation, a tight layer formed of crystallites having average dimensions of close to 150 A. are obtained. Under these conditions, in order to obtain a tight layer, the maximum rate of condensation should not exceed one-half micron per minute and the thickness of the layer should not exceed 1 micron. If the substrates are maintained at 300° C. during the condensation, a tight, adherent layer formed of crystallites of 400 A. can be formed with a rate of growth of said layer of up to 1.5 micron per minute. The maximum thickness of such a layer can, under these conditions, reach 10 to 20 microns. No substantial improvement is obtained if the rate of condensation is decreased. At rates of condensation of more than 1.5 microns per minute, the layer obtained presents mechanical stresses which may cause the breaking of said layer.

The substances to be evaporated are, naturally, selected from among those which constitute the electrolyte layer to be formed, namely, zirconium oxide and the divalent or trivalent metal oxides which stabilize the cubic phase of zirconium oxide, that is to say which form cubic solid solutions with zirconium oxide as disclosed in application Ser. No. 325,503 filed Nov. 21, 1963 now abandoned.

It is to be noted that in cubic solid solutions comprising a stabilizing oxide in solution in zirconium oxide, the stabilizing oxide does not evaporate at the same rate as the zirconium oxide, but in general evaporates faster than the latter oxide. This is for instance of solid solutions of zirconium oxide and ytterbium oxide. Thus, if one starts to evaporate a fritted bar consisting of the mixed oxide $ZrO_2$ and $Yb_2O_3$ having a composition of 90 mol % of $ZrO_2$ and 10 mol % of $Yb_2O_3$, the thin layer obtained will have a composition richer in $Yb_2O_3$ than that of the initial bar, that is to say will contain more than 10 mol % of $Yb_2O_3$, at least if only a part of the bar is evaporated. The composition of the layer obtained under such conditions is close to 79 mol % $ZrO_2$ and 21 mol % $Yb_2O_3$. The composition of the bar tends to decrease in $Yb_2O_3$ during the bombardment. This phenomenon depends greatly on the stabilizer; it is the least pronounced in the case of erbium oxide for which a proportion of 10 mol % in the constituent material of the target leads to a proportion of 10.5 mol % on the substrate. In the case of dysprosium oxide, the effect is also slight, i.e., 8 mol % target corresponding to 11 mol % on the substrate. In the case of a mixture of stabilizers formed of a rather large proportion of erbium and dysprosium oxides and furthermore containing a substantial amount of $Yb_2O_3$ there is obtained a layer the composition of which is very close to that of the target.

If it is desired to obtain an electrolyte layer of specific composition, it can be carried out by proceeding in accordance with one of the following routes, each constituting a variant of the method in accordance with the invention:

The first route consists in causing a relative displacement between the bombarded substance and the beam of electrons, so as to obtain a sweeping of the surface of the bombarded substance, either by displacing the beam while leaving the bombarded surface stationary or by leaving the beam stationary and displacing the bombarded substance. The means for displacing the beam and the bombarded substance are known and consist for instance in the case of the beam of a deflection device which may be the same as a device used for focusing the beam. It is particularly advantageous to cause the beam to effect a slow spiral displacement, for instance, at a frequency of repetition of 1 cycle per second, with a constant angular speed of 100 revolutions per second. Thus, a more energetic heating effect is obtained at the center of the spiral which forms in the sample a depression acting as an autocrucible.

This manner of operation is in particular useful when the substrate to be bombarded is a fritted bar of mixed oxide, i.e., $ZrO_2$ and stabilizing oxide of the composition which is sought for the electrolyte layer. As a result of the sweeping, the equilibrium between the bombarded region and the underlying and adjacent layers does not have time to become established and the composition of the part of the substance vaporized at each moment does not have time to become impoverished in stabilizing oxide in the event that the latter is more volatile than the zirconium oxide, or in zirconium oxide in the event that the latter is more volatile than the stabilizing oxide.

Another variant consists in using the substance to be bombarded in powder form, this substance having the same composition as the desired electrolyte, and in bringing the powder onto the conductor support at the place where it is struck by the beam of electrons as it evaporates. The powder can be poured at the desired rate, for instance, by means of a pouring funnel. Thus, each grain is entirely vaporized and the composition of the deposited electrolyte layer is identical to that of the vaporized substance. This variant is used for instance by means of the device shown in FIG. 2.

As can be noted from FIG. 2 of the powdered substance to be made conductive is poured by means of the funnel 11 at the point of impact of the electron beam 5 on the support 9 of refractory material, particularly of molybdenum or tungsten, which in its turn rests on a cooled support 10, for instance a copper support cooled by a stream of water, the assembly of the support 9 and of the support 10 acting in the same role as the support 2 of FIG. 1 and all being part of the device similar to that of FIG. 1 and operating in the same manner.

A third variant consists in bombarding not one but at least two substances intended to form the layer of electrolyte, for instance, a mixed oxide of $ZrO_2$ plus a stabilizing oxide, of a composition identical to that of the electrolyte layer to be formed and of pure zirconium oxide. By suitably regulating the energy of the bombardment applied to each of the substances, evaporation at the rate necessary for the obtaining of the desired composition in the layer can be obtained.

Each of the substances can be bombarded by a separate beam of electrons or else by using a single beam of electrons which is displaced by known means so as to strike alternately each of the substances to be bombarded for the desired period of time. In this case, the energy of the electron beam can be varied as desired, for instance, be means of a Wehnelt electrode, independently of the voltage applied.

In order to make the substance to be bombarded electronically conductive, one shall proceed in accordance with one of the following routes which constitute variants, all of which have the effect of a partially reducing the substance conferring upon the substance the property of conducting electrons, which it does not have in normal state.

In accordance with the first variant, the substance is heated to a temperature of at least 1,500° C. in a reducing gas for a few hours. As reducing gas, hydrogen, carbon monoxide or a mixture of these two gases is used, the partial oxygen pressure in the reducing gas or mixture of reducing gas being less than $10^{-10}$ mm. Hg.

In accordance with the second variant, an electric current is passed through the substance in the shape, e.g., of a fritted bar, for a sufficient period of time under suitable potential difference while heating the substance to a temperature above 800° C. in a reductive gas or a mixture of reductive gases of a type identical to those used in the first variant of partial reduction.

In accordance with a third variant, which yields the best results, at least one point of the substance to be made conductive is brought to a temperature of at least 300° C. and bombarded, under pressure of less than $10^{-4}$ mm. Hg. by a nonfocused beam of electrons or a beam of electrons having a large focal diameter and accelerated under a voltage between 1,500 and 2,000 volts for the time necessary to transmit an amount of electrical energy sufficient to obtain the electrical conductivity which permits the further electric bombardment of the substance under the evaporation conditions. It has been found that the quantity of electricity necessary to transmit to the substance under these conditions is at least 10 coulombs per gram of substance.

This third variant may be carried out by means of the device shown in FIG. 3 which consists, as can be seen, of a metallic conductive support 12 of refractory metal such as W or Mo forming an anode, placed at a fixed potential, for instance, zero potential.

The substance to be made conductive, which has for instance the shape of a bar 1, is bombarded by an unfocused beam of electrons emitted between the cathode 13 brought to a potential between 1,500 and 2,000 volts and the anode 12. The entire assembly being placed in a vacuum better than $10^{-4}$ mm. Hg. within an enclosure not shown in FIG. 3.

It is particularly advantageous to use the same device as that which serves for the evaporation of the substance and which is shown in FIG. 1. It is adequate if the electron beam 5 is not focused or its focusing diameter is increased by adjusting the focusing device 8 and establishing the potential -HT of the cathode 6 at a suitable value with respect to the acceleration anode 3 and the target anode 2, namely, between 1,500 and 2,000 volts, for the time necessary to obtain sufficient electronic conductivity. Thereupon, it is possible to proceed immediately with vaporization of the substance under the conditions indicated above, in particular by focusing the beam of electrons by means of the focusing device 8.

It is to be noted that when bombarding an ordinary stabilized zirconium target which has not been made previously electronically conductive with a finely focused electron beam accelerated to more than 4,000 volts, using the device shown in FIG. 1, in the manner indicated above, it is possible to cause the electronic conduction at the impact point of the electron beam and to obtain an emission of vapor from the bombarded substance while the rest of the substance is at low temperature. However, this phenomenon is sudden and when a fritted part is treated in this manner, it is generally broken. If the substance thus bombarded is in the form of a powder, said powder is violently expelled from the point of impact.

It is, therefore, obvious that under these conditions the formation of a layer of electrolyte having the desired characteristics, in particular a uniform thickness and sufficient imperviousness to gas, is made difficult.

EXAMPLE 1

A parallelipiped bar of a length of 10 mm. and a square section of a side of 5 mm., consisting of fritted, mixed oxide $ZrO_2$-$Yb_2O_3$ in proportions of 92:8 (mol %), the same is made electronically conductive in the following manner: A diode which is used and arranged in the manner indicated schematically in FIG. 3 and comprising a tungsten anode forming a circular horizontal plate of 10 mm. diameter and a cathode consisting of a filament, also of tungsten, the entire assembly being placed within a tight enclosure of glass, the distance between the two electrodes is 2.5 cm. The mixed oxide bar is placed on the anode, a vacuum of $5 \times 10^{-6}$ mm. Hg. is established in the enclosure and the cathode is heated by means of a current of 11 amperes under a voltage of 2.5 v. The cathode is gradually bought to a potential of $-2,000$ volts with respect to the anode. The parts of the anode which are not covered by the oxide bar first of all become red as the difference in potential between anode and cathode is increased. The current between electrodes increases progressively to a value of about 2 ma. Once the value of $-2,000$ volts has been reached for the potential difference between electrodes and the value of 2 ma., for the current, the voltage is maintained fixed. It is noted that the current remains constant under these conditions for 30 seconds and then suddenly increases to about 20 ma. This sudden increase of the current is accompanied by disappearance of the red color of the anode and the ceramic becomes red. The temperature of the ceramic, measured by means of an optical pyrometer, is then about 500° C.

These conditions are maintained for about 10 minutes whereupon the difference in potential is gradually decreased and cancelled out. The ceramic bar is allowed to cool to room temperature while maintaining the vacuum of $5 \times 10^{-6}$ mm. Hg. in the enclosure, and the bar is with-drawn from the enclosure only after it is entirely cooled. It is found that the bar which was creamy white before the treatment has become completely black; furthermore, the black color is uniform throughout the bar as can be noted by cutting the bar in any direction. Moreover, it is found that the bar which has been treated in this manner has a resistivity of the order of 1,000 ohm. cm. (measured with alternating current of 1,000 cycles/second) at room temperature while its resistivity before treatment was of the order of $10^7$ ohm. cm. at this temperature.

The bar treated in this manner is placed on the target support of a welding gun made in accordance with an arrangement similar to that shown schematically in FIG. 1. A vacuum of $5\times10^{-6}$ mm. Hg is established in the enclosure and one starts to bombard the bar with an electron beam initially focused to a spot diameter of 5 mm. at the place of impact on the bar, and inclined by an angle of 30° with respect to the vertical, the bar being itself placed with its largest dimension in horizontal position. The distance between the accelerating anode of the gun and the average point on the bar is 250 mm.

The accelerating voltage is gradually increased from 0 to 2 kv. in 5 minutes. The bar then becomes uniformly heated to 300° C approximately. The beam is then focused to a spot diameter of 0.3 mm. and the accelerating voltage increased to 3 kv. The current of the electron beam is then about 10 ma. and a tight layer of electrolyte of a composition close to that of the bar is deposited on the supports intended to receive said sublayer, the supports being placed vertically 10 cm. from the point of impact of the beam on the bar and maintained at room temperature. The layer is deposited under these conditions at the uniform rate of 1 micron thickness per minute. After 10 minutes, a perfectly tight and transparent electrolyte layer of thickness of 10 microns is obtained as a deposit.

EXAMPLE 2

The same welding gun and the same arrangement are used as in Example 1 but with a fritted, mixed oxide bar $ZrO_2$-$Yb_2O_3$ in mol percent proportions of 92 : 8, and not made electronically conductive.

This bar is made electronically conductive by means of the welding gun itself by bombarding it, under a vacuum $5\times10^{-6}$ mm. Hg. with a beam of electrons accelerated to 2 kv., and focused to a spot diameter of 10 mm. The current of the beam is then about 15 ma. The tungsten support on which the bar rests becomes heated which has the effect of also increasing the temperature of the ceramic bar.

When a point of this bar reaches about 300° C., a sudden increase is noted in the current of the electron gun, i.e., an increase to 18 ma. The bombardment conditions are then maintained stationary for 5 minutes whereupon the beam is focused to a diameter of 0.3 mm. and the evaporation is effected as in Example 1 while maintaining the vacuum of $5\times10^{-}$mm. Hg in the enclosure. The layer of electrolyte is deposited at the same rate and has the same characteristics as those of Example 1.

EXAMPLE 3

The same welding gun is used as in the preceding examples, but with vertical line to the target, at a distance of 250 mm. away. Into a water cooled copper crucible, about 20 grams of solid ceramic electrolyte of the composition $ZrO_2$ 90 mol percent $Er_2O_3$ 10 mol percent previously fritted in the form of grains having a diameter of a few millimeters are introduced.

The appearance of electronic conduction is brought about in the same manner as in the preceding two examples. From the first hot point, the electronic conduction extends rapidly throughout the mass, the beam remaining unfocused. The operation takes about 15 minutes until electronic conduction throughout the electrolyte mass is obtained.

The evaporation is then effected by focusing the beam on an area of the substance 1.3 mm, in diameter and subjecting the beam to displacement by deflection by means of a suitable electronic device of a known type so as to cause the point of impact of the beam to describe on the target a spiral of 20 mm. initial diameter with return to the center at a frequency of 1 cycle per second, and with an angular speed of 100 revolutions per second. The substrates are arranged on a Knudsen sphere of 250 mm. diameter and maintained at 300° C. for the entire time of the depositing. As substrates discs are used which have a thickness of 0.2 mm. and a diameter of 20 mm. and are of 501 stainless steel plate, as well as discs of $ZrO_2$ stabilized by 10 mol % of $Yb_2O_3$ having pores of 2 to 5 microns.

A gun with a power of 1 kw. makes it possible to obtain formation of a regular layer on the substrate with a growth speed of 1 micron per minute. A layer of 15 micron thickness, deposited under these conditions on 501 stainless steel is excellently adherent and the assembly withstands at least 150 thermal cycles between room temperature and 800° C., with a rate of heating or cooling of 400° C. per minute, without separation or splitting of the layer. On stabilized zirconium substrates, the condensed film adheres also so as to form a tight assembly which can be readily subjected to the same thermal cycles.

What is claimed is:

1. A process for depositing on a support a thin layer of ceramic, solid electrolyte suitable for a fuel cell comprising the steps of: making electrically conductive at least one substance intended to form the electrolyte layer; maintaining said substance placed on at least one conductor in an enclosure under a vacuum, said conductor being connected to at least one anode of at least one electron beam accelerating anode and being at the same potential thereof; bombarding said substance by at least one focused electron beam while increasing the energy of said beam so as to bring the substance being bombarded gradually to a temperature less than the melting point of the substance but high enough to effect vaporization; and maintaining this temperature, for a sufficient time to obtain by progressive evaporation, a layer of electrolyte of a desired thickness deposited on a support placed within the enclosure.

2. The process according to claim 1 wherein the vacuum is maintained between $10^{-4}$ to $10^{-10}$ mm.Hg.

3. The process according to claim 1 wherein the electron beam is focused forming a diameter between 0.1 to 10 mm.

4. The process according to claim 1 wherein the support upon which the electrolyte is vapor deposited is placed at a distance between 10 and 30 cm. from the point of impact of the substance being bombarded by the electron beam.

5. The process according to claim 1 wherein the bombarded substance is pure zirconium oxide.

6. The process according to claim 1 wherein the bombarded substance is an oxide mixture of zirconium oxide and at least one oxide capable of stabilizing the cubic phase of zirconium oxide.

7. The process according to claim 6 wherein the stabilizing oxide is at least one of the oxides of calcium, magnesium, scandium, yttrium, erbium, dysprosium, and a mixture of heavy rare earth oxides including erbium oxide said mixture being richer in erbium oxide than in the other heavy rare earth oxides in the mixture.

8. The process according to claim 1 wherein the bombarded substance is a fritted body.

9. The process according to claim 1 wherein the bombarded substance is powder and said powder is being poured unto the conductor support by means of a pouring funnel.

10. Process according to claim 1 wherein the electron beam is bombarding the substance by sweeping intermittently the bombarded surface in a spiral sweep.

11. The process according to claim 1 wherein the electrolyte precursor substance is made conductive by reducing the same by heating it to a temperature of at least 1,500° C. in at least one reducing gas, the partial oxygen pressure of said gas being less than $10^{-10}$ mm. Hg.

12. The process according to claim 1 wherein said electrolyte precursor substance is made conductive by passing an electric current through it, while heating said substance to a room temperature of more than 800° C. in at least one reductive gas in which the partial oxygen pressure is less than $10^{-10}$ mm. Hg.

13. The process according to claim 11 wherein the reductive gas is hydrogen or carbon monoxide.

14. The process according to claim 11 wherein the bombarded substance is made conductive by bringing at least one point of the said substance to a temperature of at least 300° C. and bombarding it under a pressure of less than $10^{-4}$ mm. Hg by an unfocused electron beam accelerated under a voltage between 1,500 and 2,000 volts for a time necessary for the transmission of a quantity of electricity of at least 10 coulombs per gram of said substance.

15. The process according to claim 1 for depositing a layer of said electrolyte of a thickness greater than 1 micron wherein the support is at a temperature of between 300° C. and 500° C. during deposition thereon.

* * * * *